United States Patent
Park et al.

(10) Patent No.: US 8,401,133 B2
(45) Date of Patent: Mar. 19, 2013

(54) MULTI-ANTENNA SYSTEM USING ADAPTIVE BEAMFORMING

(75) Inventors: Chul Gyun Park, Gyunggi-do (KR); Young Chai Ko, Seoul (KR); Kyung Tae Jo, Gyunggi-do (KR); Joun Sup Park, Gyunggi-do (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 628 days.

(21) Appl. No.: 12/640,194

(22) Filed: Dec. 17, 2009

(65) Prior Publication Data

US 2011/0033015 A1 Feb. 10, 2011

(30) Foreign Application Priority Data

Aug. 6, 2009 (KR) .................. 10-2009-0072419

(51) Int. Cl.
*H04B 7/10* (2006.01)
(52) U.S. Cl. ........ 375/347; 375/316; 375/267; 375/349; 342/375; 342/372; 342/383; 342/377
(58) Field of Classification Search .................. 375/316, 375/267, 347, 349; 342/375, 372, 383, 377, 342/359, 362, 367, 368
See application file for complete search history.

(56) References Cited

U.S. PATENT DOCUMENTS

| | | | |
|---|---|---|---|
| 6,166,690 A | 12/2000 | Lin et al. | |
| 6,177,906 B1 * | 1/2001 | Petrus | 342/378 |
| 7,965,234 B2 * | 6/2011 | Park et al. | 342/372 |
| 2004/0043794 A1 * | 3/2004 | Nakaya et al. | 455/561 |
| 2004/0178954 A1 | 9/2004 | Vook et al. | |
| 2006/0067277 A1 | 3/2006 | Thomas et al. | |
| 2007/0037528 A1 | 2/2007 | Doan et al. | |
| 2009/0040107 A1 * | 2/2009 | Yun et al. | 342/375 |
| 2009/0121936 A1 | 5/2009 | Maltsev et al. | |
| 2010/0164802 A1 * | 7/2010 | Li et al. | 342/372 |

* cited by examiner

*Primary Examiner* — Siu Lee
(74) *Attorney, Agent, or Firm* — Lowe Hauptman Ham & Berner, LLP

(57) ABSTRACT

A multi-antenna system using adaptive beamforming includes a phase shift unit, a signal combination unit, a frequency down-converter, and an analog-to-digital (A/D) converter, and a beamforming control unit. The phase shift unit includes a plurality of phase shifters which shift the phases of signals received from a plurality of antennas. The signal combination unit combines phase-shifted signals output from the plurality of phase shifters. The frequency down-converter down-converts a signal output from the signal combination unit into a baseband signal. The A/D converter converts the baseband signal into a digital signal. The beamforming control unit searches for a weight vector higher than a preset threshold signal-to-noise ratio (SNR) when a reception SNR of the digital signal output from the A/D converter is lower than the threshold SNR, and changes a currently set weight vector into the searched weight vector to provide to the phase shift unit.

2 Claims, 4 Drawing Sheets

MULTI-ANTENNA SYSTEM USING ADAPTIVE BEAMFORMING

CROSS-REFERENCE TO RELATED APPLICATIONS

This application claims the priority of Korean Patent Application No. 10-2009-0072419 filed on Aug. 6, 2009, in the Korean Intellectual Property Office, the disclosure of which is incorporated herein by reference.

BACKGROUND OF THE INVENTION

1. Field of the Invention

The present invention relates to a multi-antenna system which is applicable to a system requiring multiple antennas, and more particularly, to a multi-antenna system using adaptive beamforming, which is capable of rapidly performing beamforming for multiple antennas.

2. Description of the Related Art

In general, a wireless communication system using multiple antennas or spaced antennas (hereinafter, referred to as "multi-antennas") for high-speed wireless communications is being developed. Beamforming is one of several technologies using multi-antennas and is widely known as a method in which a receiver or transmitter uses multi-antennas to increase connection reliability in wireless environments.

Worldwide interoperability for microwave access (WiMax) standard, long-term evolution (LTE), IEEE802.11n WLAN, IEEE802.15.c WPAN and so on may be taken as examples of wireless environments in which such multi-antennas are used. In order to implement a multi-antenna system, an equal number of radio frequency (RF) chain units configured with a low noise amplifier (LNA), a mixer, a filter, an intermediate frequency (IF) signal, and an analog-to-digital (A/D) converter are needed. Therefore, the price, power consumption, and size of a multi-antenna system are being considered as problems in implementing the multi-antenna system.

In particular, it is known that an A/D converter has the highest power consumption when processing baseband signals. To minimize this power consumption, an analog beamforming or RF beamforming technology employing a minimum number of RF components may be used. In the existing baseband beamforming technology, signals received by antennas should be converted into digital signals through an A/D converter so as to calculate a weight vector which maximizes a signal-to-noise ratio (SNR).

However, when the analog beamforming technology is used, the phases of signals received by antennas are converted by phase shifters and then summed. Therefore, only one A/D converter having high power consumption may be used. Accordingly, research and development on the analog beamforming technology has been conducted intensively.

In the baseband beamforming technology according to the related art, signals received by multi-antennas may be converted into digital signals through an A/D converter so as to calculate an optimal weight vector through eigenvalue decomposition. When this technology is used, the direction of a signal received by an antenna may be accurately estimated. Therefore, it is possible to improve the performance of the multi-antenna system. However, since the number of RF chain units increases in proportion to the number of antennas, the cost of the multi-antenna system increases by the same amount, and the power consumption of the multi-antenna system increases.

To overcome such disadvantages, analog beamforming technology has been used. In the analog beamforming technology, the phases of signals received by multi-antennas are properly shifted by the phase shifters, instead of passing through RF chains, and the phase-shifted signals are then combined together.

In a technique which estimates a weight vector using the analog beamforming technology according to the related art, all vectors are applied to find an optimal vector.

However, since finding an optimal vector for all vectors may increase the complexity of a system, it is difficult to apply to a real system. In another technique, an orthogonal matrix including the entire vector space may be preset and shared by a receiver and a transmitter, and an optimal vector may be searched for within the matrix through repeated training signals. In this technique, it takes a lot of time to find the optimal vector because all vectors should be searched to find an optimal vector.

SUMMARY OF THE INVENTION

An aspect of the present invention provides a multi-antenna system using adaptive beamforming, which is capable of rapidly performing beamforming for multi-antennas.

According to an aspect of the present invention, there is provided a multi-antenna system using adaptive beamforming, including: a phase shift unit including a plurality of phase shifters which shift the phases of signals received from a plurality of antennas, each of the phase shifters shifting the phase of the corresponding received signal, depending on a preset weight vector; a signal combination unit combining phase-shifted signals output from the plurality of phase shifters; a frequency down-converter down-converting a signal output from the signal combination unit into a baseband signal; an analog-to-digital (A/D) converter converting the baseband signal output from the frequency down-converter into a digital signal; and a beamforming control unit searching for a weight vector higher than a preset threshold signal-to-noise ratio (SNR) among a plurality of prepared weight vectors when a reception SNR of the digital signal output from the A/D converter is lower than the threshold SNR, and changing a currently set weight vector into the searched weight vector to provide to the phase shift unit.

The beamforming control unit may include: a codebook comprising a plurality of weight vectors which are preset for the beamforming of the plurality of antennas; an SNR measurement unit measuring the reception SNR of the digital signal output from the A/D converter; an SNR comparison unit comparing the reception SNR from the SNR measurement unit with the preset threshold SNR; and a weight vector control unit initially setting the preset weight vector and maintaining the currently set weight vector when the reception SNR is higher than the threshold SNR, or sequentially searching for a weight vector higher than the threshold SNR among the plurality of weight vectors prepared in the weight vector codebook and changing the currently set weight vector into the searched weight vector when the reception SNR is not higher than the threshold SNR.

The weight vector codebook may include a plurality of weight vectors corresponding to combinations of the plurality of antennas in a spaced direction, and each of the weight vectors comprises phase shift values for the signals received from the plurality of antennas.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
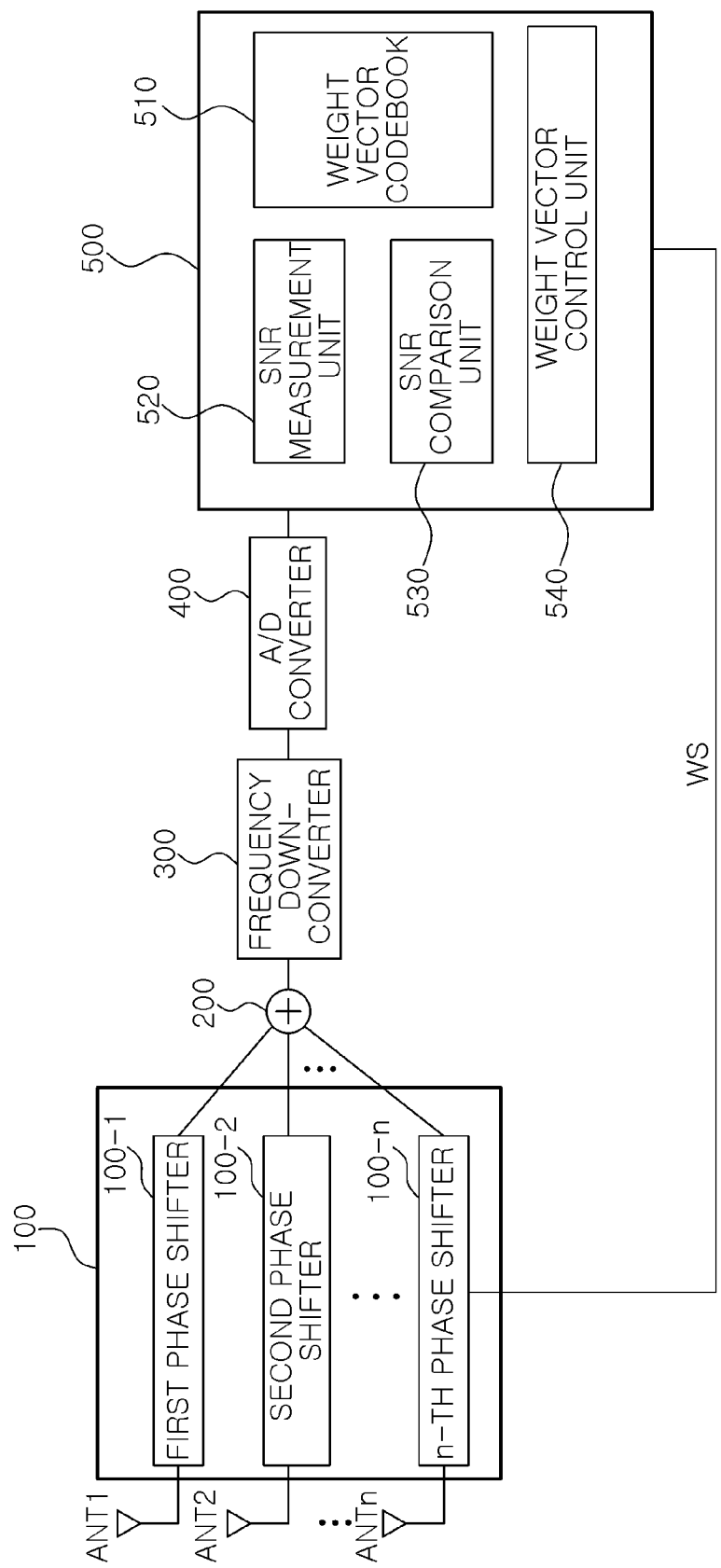
FIG. 1 is a block diagram of a multi-antenna system using adaptive beamforming according to an embodiment of the present invention.

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. Like reference numerals in the drawings denote like elements, and thus their description will be omitted.

FIG. 1 is a block diagram of a multi-antenna system using adaptive beamforming according to an embodiment of the present invention.

Referring to FIG. 1, the multi-antenna system using adaptive beamforming according to the embodiment of the present invention includes a phase shift unit 100, a signal combination unit 200, a frequency down-converter 300, an analog-to-digital (A/D) converter 400, and a beamforming control unit 500. The phase shift unit 100 includes a plurality of phase shifters 100-1 to 100-n which shift the phases of signals received from a plurality of antennas ANT1 to ANTn. Each of the phase shifters 100-1 to 100-n shifts the phase of the corresponding received signal, depending on a preset weight vector WS. The signal combination unit 200 combines phase-shifted signals output from the plurality of phase shifters 100-1 to 100-n. The frequency down-converter 300 down-converts a signal output from the signal combination unit 200 into a baseband signal. The A/D converter 400 converts the baseband signal output from the frequency down-converter 300 into a digital signal. The beamforming control unit 500 searches for a weight vector higher than a preset threshold signal-to-noise ratio (SNR) among a plurality of prepared weight vectors and changes the currently set weight vector into the searched weight vector to provide to the phase shift unit 100, when a reception SNR rd of the digital signal from the A/D converter 400 is lower than the threshold SNR rth.

The frequency down-converter 300 may be implemented in a single conversion scheme which directly down-converts the signal output from the signal combination unit 200 into a baseband signal. Alternatively, the frequency down-converter 300 may be implemented in a double conversion scheme which converts the signal output from the signal combination unit 200 into an intermediate frequency (IF) signal and then converts the IF signal into a baseband signal.

The beamforming control unit 500 includes a weight vector codebook 510, an SNR measurement unit 520, an SNR comparison unit 530, and a weight vector control unit 540. The weight vector codebook 510 includes a plurality of weight vectors W1 to Wn which are preset for the beamforming of the antennas ANT1 to ANTn. The SNR measurement unit 520 measures a reception SNR rd of the digital signal from the A/D converter 400. The SNR comparison unit 530 compares the reception SNR rd measured by the SNR measurement unit 520 with a preset threshold SNR rth. The weight vector control unit 540 initially sets the preset weight vector WS and maintains the currently set weight vector WS when the reception SNR rd is higher than the threshold SNR rth, or sequentially searches for a weight vector higher than the threshold SNR rth among the plurality of weight vectors prepared in the weight vector codebook and changes the currently set weight vector WS into the searched weight vector, when the reception SNR rd is not higher than the threshold SNR rth.

The weight vector codebook 510 includes a plurality of weight vectors W1 to Wn corresponding to combinations of the plurality of antennas ANT1 to ANTn in a spaced direction, and the weight vectors W1 to Wn include phase shift values for the signals received from the plurality of antennas ANT1 to ANTn.

Figure 2:
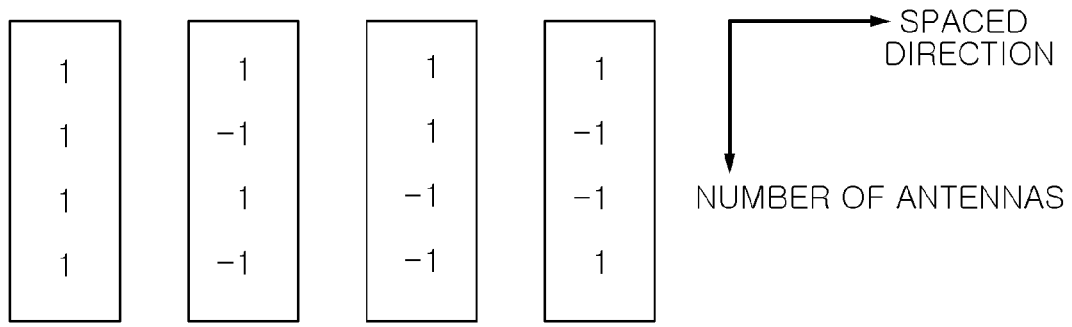
FIG. 2 is a diagram illustrating an example of a weight vector codebook according to an embodiment of the present invention.

FIG. 2 is a diagram illustrating an example of the weight vector codebook according to an embodiment of the present invention. As shown in FIG. 2, when the multi-antenna system according to the embodiment of the present invention includes first to fourth antennas, the weight vector codebook 510 includes first to fourth weight vectors W1 to W4 corresponding to combinations of the first to fourth antennas ANT1 to ANT4 in a spaced direction. In this case, each of the first to fourth weight vectors W1 to W4 includes four phase shift values for signals received from the first to fourth antennas ANT1 to ANT4.

The phase shift value is "1" or "−1". "1" may mean a maintenance of a current phase, and "−1" may mean a phase inversion.

Figure 3:
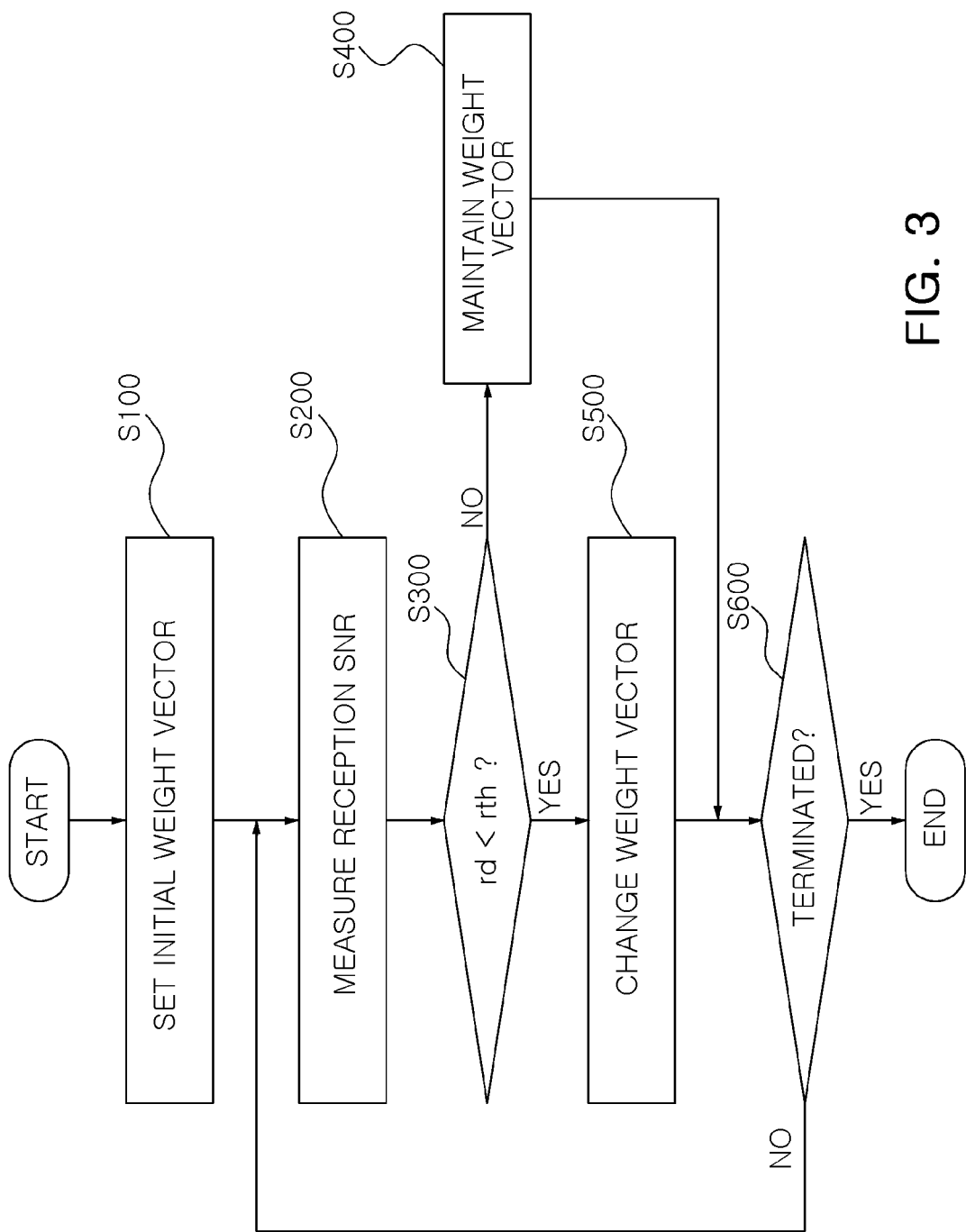
FIG. 3 is an operation flowchart of the multi-antenna system using adaptive beamforming according to an embodiment of the present invention.

FIG. 3 is an operation flowchart of the multi-antenna system using adaptive beamforming according to an embodiment of the present invention. In FIG. 3, an operation 5100 is a process of setting an initial weight vector when the multi-antenna system is activated. An operation 5200 is a process of measuring a reception SNR rd of a digital signal output from the A/D converter 400. An operation 5300 is a process of comparing the reception SNR rd measured by the SNR measurement unit 520 with a preset threshold SNR rth. An operation 5400 is a process of maintaining the currently set weight vector WS when the reception SNR rd is higher than the threshold SNR rth. An operation 5500 is a process of changing the currently set weight vector WS into a different weight vector included in the weight vector codebook when the reception SNR rd is not higher than the threshold SNR rth. An operation 5600 is a process of determining whether the operation of the multi-antenna system is terminated. Specifically, the procedure returns to the process of measuring the reception SNR rd when it is determined that the operation of the multi-antenna system is not terminated; otherwise, the operation of the multi-antenna system is terminated.

Figure 4:
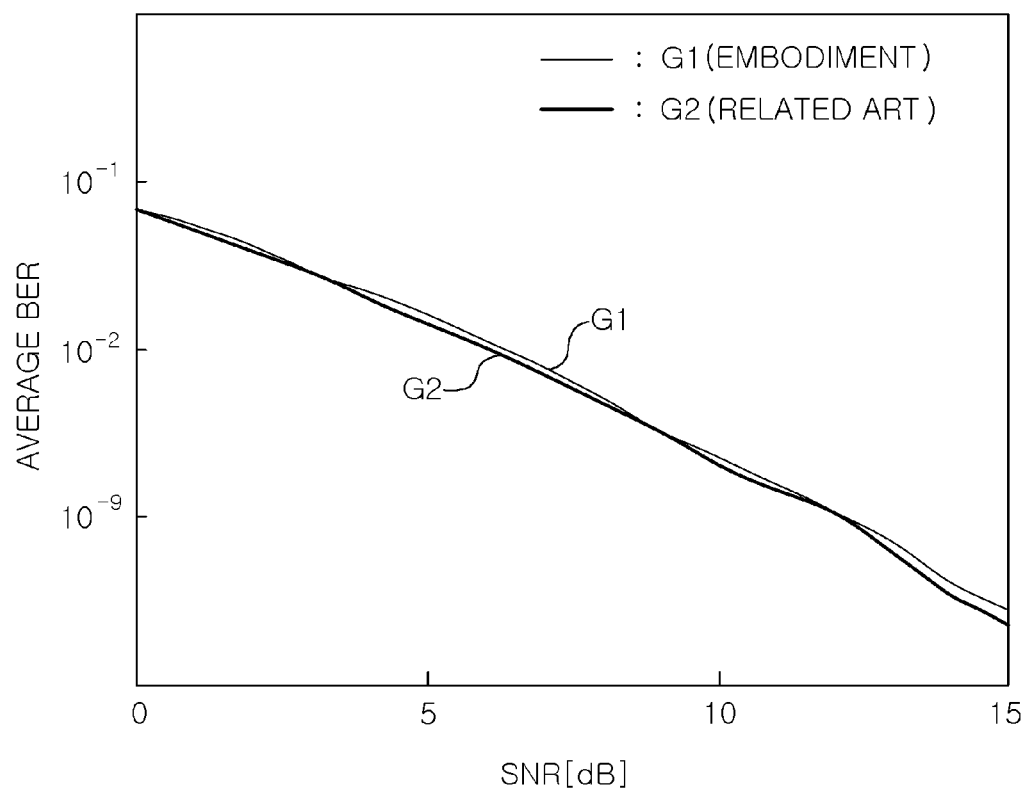
FIG. 4 is a diagram showing an average bit error rate (BER)-SNR of the embodiment of the preset invention and the related art.

FIG. 4 is a graph showing average bit error rate (BER)-SNR of the embodiment of the present invention and the related art. A graph G1 illustrates the average BER-SNR of the embodiment of the present invention, and a graph G2 illustrates the average BER-SNR of the related art.

Hereinafter, the operation and effect of the embodiment of the present invention will be described in detail with reference to the accompanying drawings.

The multi-antenna system using adaptive beamforming according to the embodiment of the present invention will be described below with reference to FIGS. 1 to 3. Referring to FIG. 1, the multi-antenna system using adaptive beamforming according to the embodiment of the present invention may include the phase shift unit 100, the signal combination unit 200, the frequency down-converter 300, the A/D converter 400, and the beamforming control unit 500, in order for rapid beamforming of multi-antennas.

The phase shift unit 100 includes the plurality of phase shifters 100-1 to 100-$n$ which shift the phases of signals received from the plurality of antennas ANT1 to ANTn. Each of the phase shifters 100-1 to 100-$n$ shifts the phase of the corresponding received signal, depending on the weight vector WS set by the beamforming control unit 500.

The signal combination unit 200 combines the signals output from the phase shifters 100-1 to 100-$n$, and outputs the combined signal to the frequency down-converter 300.

The frequency down-converter 300 down-converts the signal output from the signal combination unit 200 into the baseband signal.

For example, the frequency down-converter 300 may adopt a single conversion scheme or a double conversion scheme. When the frequency down-converter 300 adopts a single conversion scheme, the frequency down-converter 300 may directly down-convert the signal output from the signal combination unit 200 into the baseband signal.

On the other hand, when the frequency down-converter 300 adopts a double conversion scheme, the frequency down-converter 300 may convert the signal output from the signal combination unit 200 into the IF signal and then covert the IF signal into the baseband signal.

The A/D converter 400 converts the baseband signal output from the frequency down-converter 300 into a digital signal to output the digital signal to the beamforming control unit 500.

When the reception SNR rd of the digital signal output from the A/D converter 400 is lower than the preset threshold SNR rth, the beamforming control unit 500 sequentially searches for a weight vector higher than the threshold SNR rth among the plurality of prepared weight vectors and changes the currently set weight vector WS into the searched weight vector to provide to the phase shift unit 100.

The beamforming control unit 500 according to an embodiment of the present invention will be described below with reference to FIGS. 1 to 3.

Referring to FIG. 1, the beamforming control unit 500 may include the weight vector codebook 510, the SNR measurement unit 520, the SNR comparison unit 530, and the weight vector control unit 540, in order for a rapid beamforming control of the multi-antennas.

The weight vector codebook 510 may include a plurality of weight vectors W1 to Wn which are preset for the beamforming of the antennas ANT1 to ANTn.

For example, the weight vector codebook 510 includes a plurality of weight vectors W1 to Wn corresponding to combinations of the plurality of antennas ANT1 to ANTn in a spaced direction. The weight vectors W1 to Wn may include phase shift values for the signals received from the respective antennas ANT1 to ANTn.

The SNR measurement unit 520 measures a reception SNR rd of the digital signal output from the A/D converter 400.

The SNR comparison unit 530 compares the reception SNR rd measured by the SNR measurement unit 520 with a preset threshold SNR rth.

The weight vector control unit 540 initially sets the preset weight vector WS and maintains the currently set weight vector WS when the reception SNR rd is higher than the threshold SNR rth, or sequentially searches for a weight vector higher than the threshold SNR rth among the plurality of weight vectors prepared in the weight vector codebook and changes the currently set weight vector WS into the searched weight vector when the reception SNR rd is not higher than the threshold SNR rth.

In the process of changing the weight vector, a plurality of reception SNRs rd corresponding to the plurality of weight vectors included in the weight vector codebook are sequentially compared with the threshold SNR rth. When a reception SNR rd higher than the threshold SNR rth is found during the comparison process, the search process is stopped, and the currently set weight vector WS is substituted with the searched reception SNR rd. Since the search process is stopped when a reception SRN rd higher than the threshold SNR rth is found, a full search need not be performed on the plurality of weight vector of the weight vector codebook. Accordingly, it is possible to change the weight vector more rapidly.

As described above, the size of the codebook and the threshold SNR may be changed depending on the requirements of a system to be used. For example, in the case of a wireless communication system having four receiving antennas, when the size of a codebook is four, the codebook may be configured as shown in FIG. 2.

Referring to FIG. 2, when the weight vector codebook 510 according to the embodiment of the present invention includes first to fourth weight vectors W1 to W4 corresponding to combinations of the first to fourth antennas ANT1 to ANT4 in the spaced direction, each of the first to fourth weight vectors W1 to W4 includes four phase shift values for signals received from the first to fourth antennas ANT1 to ANT4.

The phase control value is "1" or "−1". "1" may mean a maintenance of a current phase, and "−1" may mean a phase inversion.

While the codebook of FIG. 2 is configured with four orthogonal vectors, a larger number of weight vectors may be arranged in the codebook in order for more precise beamforming. When designing the codebook, orthogonal vectors are first arranged to include the entire space. When the size of the codebook increases, the weight vectors may be arranged at intermediate values of the orthogonal vectors in order to divide the space uniformly.

Meanwhile, the threshold SNR may differ depending on the requirements of a multi-antenna receiver. In general, when the threshold SNR is high, the receiver requires a higher SNR. Accordingly, the conversion of weight vector frequently occurs. On the other hand, when the threshold SNR is low, a reception SNR required by the system is low. In this case, the conversion of weight vector does not occur frequently.

Referring to FIG. 4, it can be seen that the performance of the embodiment of the present invention is similar to that of a full search technique according to the related art, when the graph G1 showing the average BER-SNR of the embodiment of the present invention is compared with the graph G2 showing the average BER-SNR of the related art.

In the technique of the embodiment of the present invention, although a full search process is not performed, a reception SNR higher than the threshold SNR is searched for and a weight vector corresponding to the searched reception SNR is set. Therefore, the process may be performed at a much higher speed than in the full search technique according to the related art.

As described above, when the analog beamforming technology is used in the multi-antenna system according to the embodiment of the present invention, the phase shifters are used in the RF stage. Therefore, a system may be implemented using only one A/D converter without reduction of performance. Furthermore, as the use of the A/D converter is reduced, the system's power consumption may be reduced.

When the analog beamforming technology having low power consumption is used, the implementation may be simplified in comparison with the related art, and the requirements of a system designer may be satisfied. Further, the beamforming vector conversion technique according to the threshold SNR is a technique suitable for implementing a high-speed wireless communication system which should minimize the complexity of the system because it should process several Gbps data in real time.

According to the embodiment of the present invention, the SNRs of signals received from the multi-antennas are compared with the threshold SNR, and a corresponding beamforming weight vector is searched for from the codebook to shift the phase of the RF signal. Therefore, the beamforming of the multi-antennas may be rapidly performed.

While the present invention has been shown and described in connection with the exemplary embodiments, it will be apparent to those skilled in the art that modifications and variations can be made without departing from the spirit and scope of the invention as defined by the appended claims.

What is claimed is:

1. A multi-antenna system, comprising:
a phase shift unit including a plurality of phase shifters configured to shift phases of signals received from a plurality of antennas, respectively, based on a preset weight vector;
a signal combination unit coupled to the phase shifters and configured to receive phase-shifted signals from the phase shifters to combine the phase-shifted signals;
a frequency down-converter configured to down-convert a signal output from the signal combination unit into a baseband signal;
an analog-to-digital (A/D) converter configured to convert the baseband signal output from the frequency down-converter into a digital signal; and
a beamforming control unit coupled to the A/D converter and configured to receive the digital signal to change the preset weight vector currently set in the phase shift unit based on a reception signal-to-noise ratio (SNR) of the digital signal, wherein
the beamforming control unit comprises:
a codebook comprising a plurality of preset weight vectors which are preset for beamforming of the antennas;
an SNR measurement unit coupled to the A/D converter and configured to measure the reception SNR of the digital signal;
an SNR comparison unit coupled to the SNR measurement unit and configured to compare the reception SNR from the SNR measurement unit with a preset threshold SNR; and
a weight vector control unit coupled to the phase shifter unit and configured to
initially set the preset weight vector,
maintain the preset weight vector currently set in the phase shift unit when the reception SNR is higher than the threshold SNR, and
search sequentially for a weight vector among the preset weight vectors in the codebook corresponding to a reception SNR higher than the threshold SNR, and substitute the preset weight vector currently set in the phase shift unit with the searched weight vector when the reception SNR is not higher than the threshold SNR.

2. The multi-antenna system of claim 1, wherein
the preset weight vectors included in the codebook correspond to combinations of spatial directions of the antennas, and
each of the weight vectors includes phase shift values for the signals received from the antennas.

* * * * *